UNITED STATES PATENT OFFICE 2,408,128

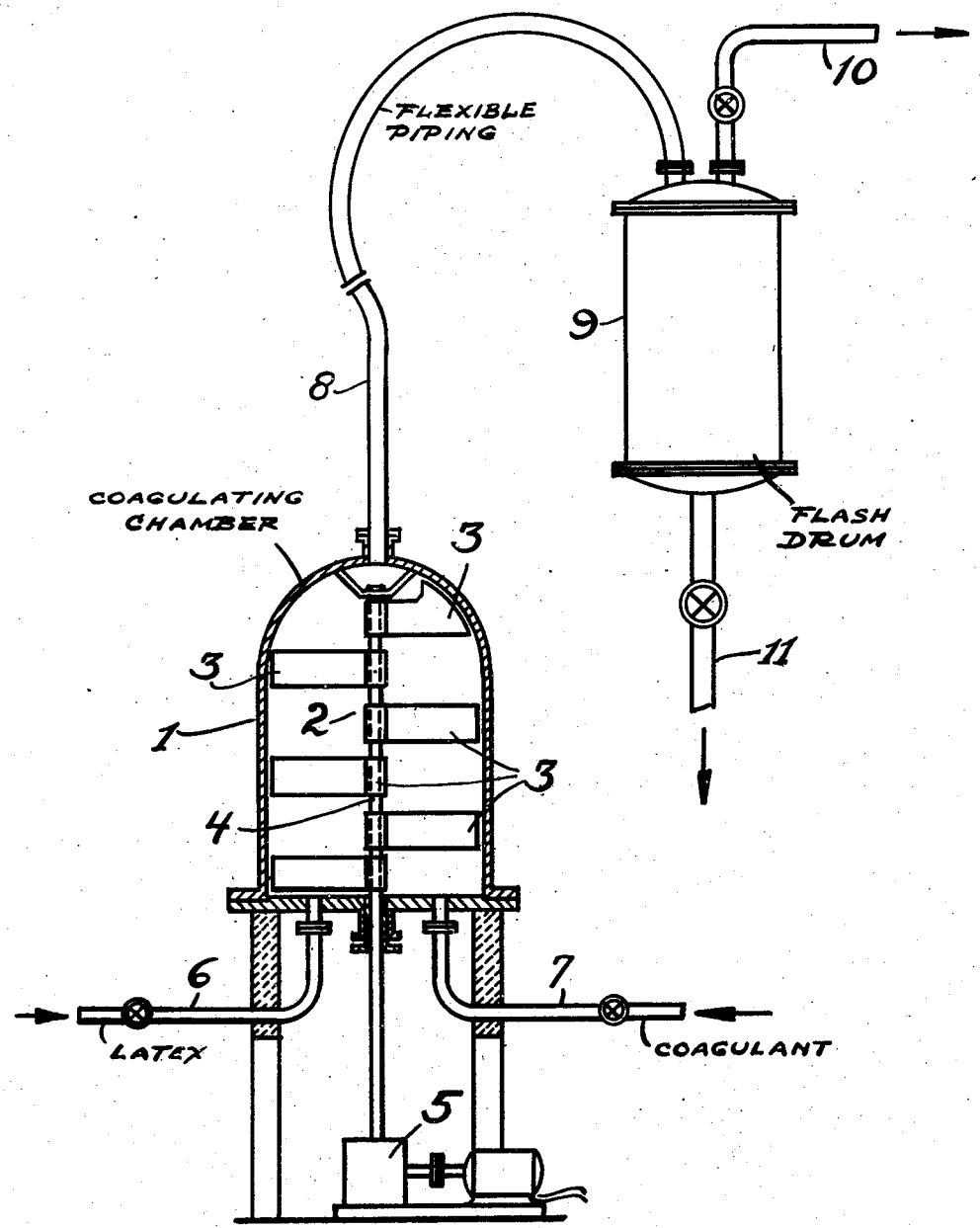

COAGULATION PROCESS

Walter Squires, Jr., and Paul T. Parker, Baton Rouge, La., assignors to Standard Oil Development Company, a corporation of Delaware Application October 24, 1942, Serial No. 463,146

5 Claims. (Cl. 260—96)

The present invention pertains to the preparation of synthetic rubber-like materials, and particularly to a method and apparatus for coagulating lactices continuously.

It is an object of this invention to provide the art with a method and apparatus whereby latices, particularly those obtained by the polymerization of diolefins and in particular the copolymerization of diolefins with other compounds containing a single C=C linkage in aqueous emulsion may be coagulated continuously.

It is a further object of the present invention to provide a method and apparatus whereby latices of synthetic rubber-like materials may be coagulated continuously under carefully regulated pressure without the use of valves, and under controlled conditions of time of contact and agitation.

These and other objects will appear more clearly from the detailed description and claims which follow.

The continuous coagulation of latex has constituted a major problem in devising a system for the continuous production of "Buna S," of "Perbunan," and other synthetic rubber-like materials in aqueous emulsion. The latices themselves have a tendency to break and coat the surfaces of the equipment with which they come into contact and the coagulates obtained upon precipitation of the latices are as a general rule extremely sticky in character. Because of its sticky characteristics, the coagulate adheres to the equipment, resulting in the plugging of lines and valves through which the coagulate passes. Since continuous operation lends itself more readily to mass, or quantity, production than batch operation, it is obviously desirable, if not essential, to devise a continuous method of operation that will not be subjected to periodic interruptions for the cleaning or unplugging of lines, valves and other equipment.

We have found that latices of synthetic rubber-like materials may be coagulated continuously without any danger of plugging lines or other equipment if separate streams of latex and coagulant are introduced at the bottom of a coagulating chamber at substantially the same level and at low velocity, and the contents of the coagulation chamber are subjected to a moderate agitation while maintained under an optimum elevated pressure. By moderate agitation we mean an agitation sufficient to prevent coalescence of the coagulate particles into lumps which can not be washed but yet not sufficient to reduce the particles of coagulate to such a small size that they do not filter readily.

A suitable apparatus for carrying out our process is illustrated diagrammatically in the accompanying drawing.

In the figure, 1 is a coagulating chamber which is provided with a stirring device 2. As shown, and as preferred, the stirring device consists of a series of flat paddles 3 attached to a central shaft 4, the paddles and shaft lying in the same plane. The clearance between the paddles and the walls of the coagulating chamber should be small in order to prevent layers of coagulate from building up on said walls. The paddles 3 should be large enough both in width and length to cover, when those on one side of the shaft are staggered with respect to those on the other side, more than half the volume of the coagulation chamber. It is preferred that the paddles 3 be of such dimensions that the cylinder of slurry touched by each blade be larger than the cylinders between the several paddles and above the top paddle and below the bottom paddle. When the coagulation chamber and cooperative stirring device are so constructed, and the stirrer is rotated at about 300–400 R. P. M., it is found that the agitation is extremely uniform and effective.

The shaft 4 is connected to a suitable driving means, such as the motor and gear box 5.

A line 6 is provided for supplying latex to the bottom of the coagulation chamber and a line 7 is similarly provided for the supply of brine or other suitable coagulant. As shown, the lines 6 and 7 discharge into the coagulating chamber at the same, or substantially the same level, and preferably at the bottom, in order that the chamber can be effective for its entire height in bringing about contact of the latex with the precipitant to the end that coagulation of the former will be complete.

The latex and coagulating medium are supplied to the coagulating chamber at a relatively low linear velocity, for example, at a velocity of about 1 foot per second. The velocity can be varied somewhat from this figure and generally may be between 0.5 and about 5 feet per second. The latex and the coagulant are supplied to the chamber under pressures which generally are not more than about 5 lbs./sq. in. greater than the pressure maintained in the coagulation chamber. The size of the coagulation chamber 1 is so proportioned to the rate at which latex and coagulant are supplied that the mixture remains in the coagulation chamber about 1½ to about 2 minutes. From this point of view of capacity it is desirable to keep the residence time of the latex in the coagulator to a minimum and it has been found that residence times of this order are suitable. However, except for the loss in capacity there would be no objection to the retention of the latex for longer periods.

The coagulated latex is discharged from the coagulation chamber through pipe 8, which, in accordance with our invention, is constructed as a variable height standpipe. As is disclosed and claimed in application Serial No. 407,476, filed August 19, 1941, Wendell W. Waterman et al., rubber-like polymers or interpolymers of the "Buna" type are advantageously coagulated in the presence of a small, somewhat critical proportion of a low boiling hydrocarbon. The hydrocarbon may be that portion of the original diolefin which remains in monomeric form after the polymerization reaction has been carried to the desired point, or it may be added to the latex after it has been stripped of monomeric materials. In either case, the presence of the low boiling hydrocarbon results in a substantial reduction in the amount of coagulant required and leads to the formation of a coagulate of a more granular and less sticky nature than is obtainable in the absence of the hydrocarbon. Coagulation in the presence of such hydrocarbons leads to the formation of coagulates of uniform particles and of any desired size, which are particularly easy to wash free from catalyst, emulsifier, coagulant, and any other water-soluble impurities. Since the hydrocarbon boils at temperatures below the temperature at which the latex is ordinarily coagulated, the latex must be maintained under pressure in order to prevent the hydrocarbon from flashing off and becoming ineffective to modify the coagulate as described. While batch coagulation under pressure may be carried out without any particular difficulty, continuous coagulation under pressure has given rise to serious problems, since valves provided in lines for maintaining the necessary pressure in the coagulating zones become coated with coagulate, eventually becoming completely plugged, thereby necessitating shutting down the equipment and cleaning the lines and valves of coagulate. The use of a variable height standpipe in accordance with the present invention completely avoids these difficulties. In the first place since the height of the standpipe is variable the pressure in the coagulation chamber may be easily and accurately adjusted. Moreover, the standpipe is free from obstructions, such as are present in valves, and, accordingly, there is no point at which a plug of coagulate can be built up. A further extremely valuable feature of the variable height standpipe is that as the hydrostatic pressure on the coagulate diminishes as the coagulate passes up through the standpipe, a point is quickly reached at which the hydrocarbon present vaporizes. The bubbles of hydrocarbon gases thus liberated serve to subject the particles of coagulate to a mild agitation which serves to prevent settling or stratification of the coagulate. The size of the standpipe 8 is so proportioned that the linear velocity of the coagulate passing therethrough is relatively low, generally of the order of about 1 ft./sec.

The standpipe 8 discharges into the coagulate accumulator, or flash drum 9, wherein the gases freed from the slurry are separated and vented through pipe 10 to a suitable gas recovery system. Since the gas liberated is usually the diolefin used originally or added to a stripped latex, it is obvious that the gas vented off may be recycled in the system and used as part of the charge supplied to the polymerization reactor, or it may be compressed and utilized for repressuring a stripped latex. The coagulate is withdrawn from accumulator 9 through pipe 11 and sent to filters and the like for washing and drying the coagulate.

If the quantity of hydrocarbon contained in the latex is not sufficient to keep the coagulate in the standpipe agitated, further amounts of hydrocarbon or other gaseous material such as carbon dioxide may be introduced, either in the chamber 1 or directly into the standpipe. The agitation provided by the release of bubbles of gas in the coagulate slurry is highly effective in preventing the agglomeration of the coagulate into large lumps or masses. Mechanical agitation of the coagulate, as with rapidly rotating stirrers and the like, is not satisfactory since the stirrers exert an attritioning effect so that the coagulate particles are broken down to such a small size that they cannot be filtered.

Our invention is applicable to the coagulation of a large variety of emulsion polymerizates such as "Perbunan" or "Buna S" type polymers as well as modified styrene interpolymers such as are described in application Serial No. 408,814, filed Aug. 29, 1941, by Anthony H. Gleason, et al.

The particular method of preparing the polymerizates is not critical and in general it is noted that it may be prepared in any of the usual manners. For example, a diolefine such as butadiene or its homologues, and a substance capable of copolymerizing therewith, such as acrylic acid nitrile, methacrylic acid nitrile, styrene and its homologues, acrylic and methacrylic acid esters, methyl vinyl ketones and the like, are emulsified in about double the quantity of water, using a suitable emulsifier such as a soap or other surface active material. Polymerization of the resultant emulsion is effected at about room temperature, or slightly higher, and in the presence of a suitable oxygen liberating catalyst such as hydrogen peroxide or an alkali metal or ammonium perborate or persulfate.

The polymerization is continued until approximately 75% of the monomeric compounds are polymerized. The particular percentage conversion is a variable, depending upon the nature of the initial materials used and the physical properties desired in the final polymer.

The resultant latex may then be subjected to a stripping operation to remove unreacted monomeric starting materials, or it may be passed directly through the line 6 to the coagulation chamber. If the latex is stripped of such monomeric materials it is necessary to "repressure" it or add thereto a suitable low boiling hydrocarbon such as butadiene, before introducing it into the coagulation chamber.

The following examples are illustrative of our invention but it is to be understood that our invention is by no means limited thereto since numerous modifications are possible within the scope of the present invention and the following claims.

*Example I*

The continuous coagulation of a "Perbunan" latex, prepared by the emulsion copolymerization of butadiene and acrylonitrile to about 75% conversion was accomplished by feeding the latex at a temperature of 100° F. to the bottom of a closed steel vessel of 1.3 gallons capacity at a rate of 24 gallons per hour. Simultaneously the coagulant, a saturated solution of sodium chloride at a temperature of 85° F. was fed to the bottom of the vessel at a rate of 24 gallons per hour. The mixture was agitated at the rate of 345 R. P. M. with an agitator consisting of seven flat paddles mounted on a centrally placed drive shaft connected to a gear box and electric motor. The nominal holdup time was 1.62 minutes. The coagulated mixture from the coagulator was taken off through a flexible line elevated to a height sufficient to give a hydrostatic pressure in the coagulator of about 12 lb. gauge. Complete coagulation and trouble-free operation were obtained for a period of 3½ hours.

*Example II*

A latex prepared by the emulsion copolymerization of styrene and isoprene carried to about 90% conversion was diluted with 50% of its volume of water and the diluted latex at a temperature of 100° F. was fed to the coagulator described above at a rate of about 18½ gallons per hour. An 18% solution of sodium chloride at a temperature of 90° F. was simultaneously pumped to the coagulator at a rate of 15½ gallons per hour. Agitation was maintained at 345 R. P. M. The coagulated mixture was taken off through a flexible line at substantially atmospheric pressure. The nominal holdup time in the coagulator was 2.3 minutes.

What we claim and desire to secure by Letters Patent, is:

1. The process of preparing synthetic rubberlike materials, which comprises passing a stream of coagulant and a stream of a latex obtained by the polymerization of a diolefin in aqueous emulsion, said latex containing some low-boiling unpolymerized diolefin, into a coagulation zone at a low linear speed, agitating the latex and coagulant in the coagulation zone for a period sufficient to cause uniform intermixing of the latex and coagulant and under a hydrostatic pressure imposed by a liquid column containing coagulate which has left said zone, said pressure being sufficient to prevent the unpolymerized low-boiling diolefin from flashing off in said zone, and discharging the stream of coagulate and aqueous suspension medium against a gradually diminishing hydrostatic head outside the coagulation zone, whereby the unpolymerized low-boiling diolefin is permitted to vaporize and agitate said liquid column.

2. The process as defined in claim 1, wherein the latex is an emulsion copolymerizate of a diolefin and a compound containing a single C=C linkage.

3. The process as defined in claim 1 wherein the latex is an emulsion copolymerizate of a butadiene hydrocarbon and a compound containing a single C=C linkage.

4. The process as defined in claim 1 wherein the latex is obtained by the polymerization of butadiene-1,3 and acrylonitrile in aqueous emulsion.

5. The process as defined in claim 1 wherein the latex is obtained by the polymerization of butadiene-1,3 and styrene in aqueous emulsion.

WALTER SQUIRES, Jr.
PAUL T. PARKER.